United States Patent
Ishiyama et al.

(10) Patent No.: US 7,292,741 B2
(45) Date of Patent: Nov. 6, 2007

(54) MULTI-INPUT OPTICAL SWITCH

(75) Inventors: Yutaka Ishiyama, Tokyo (JP); Hideki Urabe, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 0 days.

(21) Appl. No.: 11/565,064

(22) Filed: Nov. 30, 2006

(65) Prior Publication Data
US 2007/0122076 A1    May 31, 2007

(30) Foreign Application Priority Data
Nov. 30, 2005    (JP) .............................. 2005-346265

(51) Int. Cl.
*G02B 6/00*    (2006.01)
*G02B 6/26*    (2006.01)
(52) U.S. Cl. ............................. 385/12; 385/13; 385/16; 385/147
(58) Field of Classification Search ................. 385/12, 385/13, 16, 19, 147
See application file for complete search history.

(56) References Cited
U.S. PATENT DOCUMENTS
5,903,000 A * 5/1999 Juniman ................ 250/231.13
6,297,896 B1 * 10/2001 Kikuchi et al. ................ 398/9

FOREIGN PATENT DOCUMENTS
JP    5055433    3/1993

* cited by examiner

*Primary Examiner*—Kevin S. Wood
*Assistant Examiner*—John M Bedtelyon
(74) *Attorney, Agent, or Firm*—Cermak Kenealy & Vaidya LLP

(57) ABSTRACT

A multi-input optical switch can include a base plate that carries at least one photo sensor and multiple LEDs which are arranged at positions separated by approximately the same angular interval. A first mask can be formed in an approximately cylindrical shape and can include multiple through holes. A second mask can be formed as an approximately flat light blocking plate, and can include a translucent area. A translucent light guiding body can include an approximately flat plate portion, a protruded portion which extends downward from a center portion of the plate portion, a rod portion which extends upward from the center portion of the plate portion, a first total reflection surface and a second total reflection surface. A third mask can be provided with a tubular cup shape that diverges downward, and has an opening at a bottom end, a step portion at an intermediate position thereof, and at least one through hole on an upper cylindrical wall above the step portion. A rod portion of the light guiding body can be operated to freely tilt, rotate, and move up and down.

19 Claims, 11 Drawing Sheets

MULTI-INPUT OPTICAL SWITCH

This application claims the priority benefit under 35 U.S.C. § 119 of Japanese Patent Application No. 2005-346265 filed on Nov. 30, 2005, which is hereby incorporated in its entirety by reference.

BACKGROUND

1. Field

The presently disclosed subject matter relates to a multi-input optical switch. More particularly, the presently disclosed subject matter relates to a multi-input optical switch that can include an optical system which detects a tilted direction, a rotational angle, and up/down of an operation lever by means of light as a detection medium.

2. Description of the Related Art

There has conventionally been proposed a multi-input switch as shown in FIG. 17, which has multiple operation means. In FIG. 17, the multi-input switch 50 includes an operation lever 51, a first switch unit 52 which detects whether the operation lever 51 is depressed or not (by a depressing operation applied to the operation lever 51), a second switch unit 53 which detects a tilted direction (caused by a tilting operation applied to the operation lever 51), and a third switch unit 54 which detects a rotational angle (caused by a rotating operation applied to the operation lever 51). The first switch unit 52, the second switch unit 53, and the third switch unit 54 are respectively provided with a push-button switch 55, potentiometers 56, and a photo coupler 57.

The first switch unit 52 detects whether the depressing operation is carried out (or not) as follows. When a knob 58 attached to one end of the operation lever 51 is pressed down, an action rod 59 attached to the other end of the operation lever 51 moves down, and turns on the push button switch 55. When the pressing force is removed, an energizing force provided by a coil spring 60 returns the operation lever 51 to its original state, the action rod 59 moves up, and the push button switch 55 is turned off.

The second switch unit 53 detects the direction of the tilt as follows. A pair of approximately semicircular movable arms 62 respectively including a slot 61 are arranged orthogonally with respect to each other. A pair of shaft portions 63 are provided on both ends of the respective movable arms 62, one of the shaft portions 63 being fixed to a rotational shaft 64 of the potentiometer 56, and the operation lever 51 passing through an intersection of the slots 61. When the knob 58 is tilted to a desired direction, the rotational shafts 64 of the potentiometers 56 are rotated via the shaft portions 63 provided on the movable arms 62, and the tilted direction of the operation lever 51 is thus detected. When a tilting force is removed, the energizing force of the coil spring 60 returns the operation lever 51 to its original state, and the rotational shafts 64 of the potentiometers 56 return to the neutral position of the rotation via the shaft portions 63 of the movable arms 62, thereby returning the potentiometers 56 to the neutral state.

The third switch unit 54 detects the rotational angle as follows. Light reflecting bodies 65 are formed on an outer periphery of the action rod 59 provided on the end portion of the operation lever 51. When the knob 58 is rotated, light emitted from a light emitting portion 66 of the photo coupler 57 and that is reflected by the light reflecting body 65 on the action rod 59 is received by a light receiving portion 67 of the photo coupler 57. The received photo signal is output to a rotational angle detector 68, and the rotational angle detector 68 thus detects the rotational angle of the operation lever 51 (refer to the conventional art Japanese Laid-Open Utility Model Publication No. H5-55433, for example).

The multi-input switch 50 configured as described above has mechanical contacts within the components, which causes problems in durability and detection reliability for a long-term operation.

In order to detect the tilted direction by a tilting operation applied to the operation lever 51, it is necessary to provide the potentiometers 56 with an external component and circuit which apply signal conversion, such as voltage conversion and A/D conversion, to an output therefrom, resulting in a complicated overall configuration, and an increased cost.

With regards to the detection of the rotational angle that changes due to the rotating operation applied to the operation lever 51, though a relative rotational angle can be detected, an absolute rotational angle with respect to a reference position cannot be detected.

Similarly, if the operation lever 51 is rotated at a high speed, a detection miss may occur, resulting in a possible degradation of detection precision.

SUMMARY

In accordance with an aspect of the presently disclosed subject matter, a multi-input optical switch which can detect absolute displacements at a high precision, and is excellent in durability and reliability, can be provided.

In accordance with another aspect of the disclosed subject matter a multi-input optical switch can include: a base plate that carries at least one photo sensor; multiple LEDs which are arranged at positions separated by approximately the same angular interval on approximately the same circle about the photo sensor, and which emit light in a direction in parallel with a surface of the base plate toward the photo sensor, and in an upward direction with respect to the surface of the base plate; and a first mask which is approximately cylindrical in shape and has openings on both ends with an outer diameter smaller than the diameter of the circle on which the LEDs are arranged, and which has multiple through holes which are respectively disposed on lines connecting the respective LEDs and the photo sensor; a second mask that is formed as an approximately flat light blocking plate, and partially has a translucent area which passes light traveling upward from the LED; a light guiding body that is made of a translucent material, and which has an approximately flat plate portion, a protruded portion which extends downward from a center portion of the plate portion, a rod portion which extends upward from the center portion of the plate portion; a first total reflection surface which is provided on an outer peripheral portion and totally reflects the light which was emitted upward from the LED and passed the translucent area, toward a center portion of the light guiding body; and a second total reflection surface which totally reflects the light which is totally reflected by the first total reflection surface, toward the protruded portion; and a third mask in a tubular cup shape that has an outer diameter that is smaller than the inner diameter of the first mask, diverges downward, and has an opening at a bottom end, a step portion at an intermediate position thereof, and at least one through hole on an upper cylindrical wall above the step portion at a position to pass, upon the third mask being pushed down, the light from the LED through the through hole so as to lead to the inside of the cylinder of the third mask; wherein the second mask can be integrally joined to the protruded portion of the light guiding body, a top end portion of the third mask can be integrally joined to an end portion of the protruded portion, and the rod portion can be operated to freely tilt, rotate, and move up and down the light guiding body while the photo sensor and the end portion of the protruded portion of the light guiding body are facing each other.

Moreover, the respective LEDs can emit pulsed light in a sequential time-division manner according to a unique modulation code.

The photo sensor can be a photodiode, a PIN photodiode, a phototransistor, or the like.

When the light guiding body is tilted, the light emitted from the LED mounted on a side opposite to a tilted-down side can be directed to pass through the through hole provided on the first mask, and can thus be detected by the photo sensor.

When the light guiding body is rotated, the light emitted from the LEDs can be directed to pass through the translucent area provided on the second mask, enter into the light guiding body, be guided through the light guiding body, and emerge from the end surface of the protruded portion, and can thus detected by the photo sensor.

Upon the light guiding body being moved down, the light emitted from the LEDS can be directed to sequentially pass through the through holes provided on the first mask and the through holes provided on the third mask, and can be detected by the photo sensor.

The multi-input optical switch according to the disclosed subject matter can be configured to detect the tilted direction, the rotational angle, and the downward movement by identifying the pulse modulation code of the pulsed light detected by the photo sensor when the operation lever is tilted, rotated, and depressed. As a result, the absolute displacements can be detected at a high precision, and the portions relating to the switch detection do not have mechanical contacts, resulting in a multi-input optical switch that is excellent in durability and detection reliability.

DETAILED DESCRIPTION OF EXEMPLARY EMBODIMENTS

Figure 1:
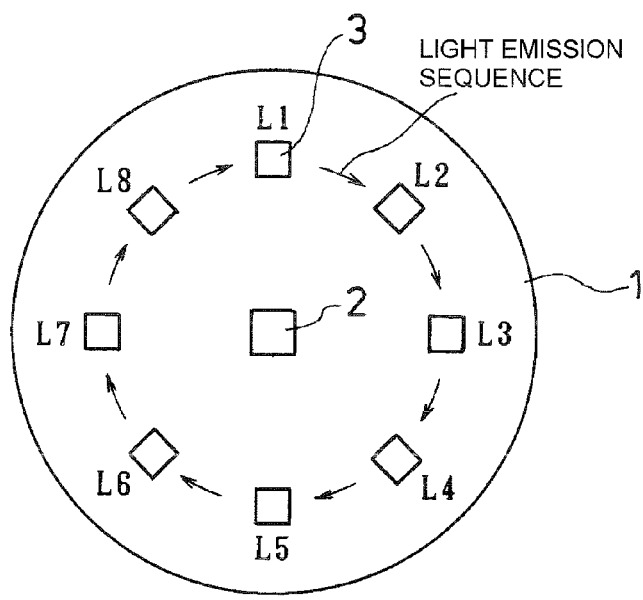
FIG. 1 is a plan view of an embodiment of a base plate for a multi-input optical switch made in accordance with principles of the disclosed subject matter.

A description will now be given of exemplary embodiments of the disclosed subject matter with reference to FIGS. 1 to 16. Similar or identical components are denoted by the same numerals throughout the drawings. The described embodiments are only examples of the disclosed subject matter, and thus include certain technical features. The following description should not be deemed and is not intended to limit the scope of the disclosed subject matter to the depicted embodiments.

A base plate 1 carrying LEDs 3 and a photo sensor 2 can include a first mask 7, a second mask 4, a third mask 9, and a light guiding body 13.

On the approximately circular base plate 1, at least one photo sensor 2 can be mounted at the substantial center thereof. Multiple LEDs 3 are arranged at positions separated by approximately the same angular interval on approximately the same circle about the photo sensor 2, as shown in FIG. 1. According to this embodiment, eight LEDs are used.

The photo sensor 2 can be a semiconductor light receiving element such as a photodiode, a PIN photodiode, a phototransistor or the like. The semiconductor light receiving element can be mounted while the optical axis thereof is approximately orthogonal to the base plate. The LEDs 3 can be respectively mounted such that optical axes thereof are directed in a direction approximately orthogonal to the base plate, while simultaneously being directed in a direction approximately parallel with the base plate and directed toward the photo sensor 2. Namely, the respective LEDs 3 are configured to emit light in two directions, which are a direction directed upward with respect to the surface of the base plate (direction toward the light guiding body), and a direction toward the photo sensor 2.

Figure 2:
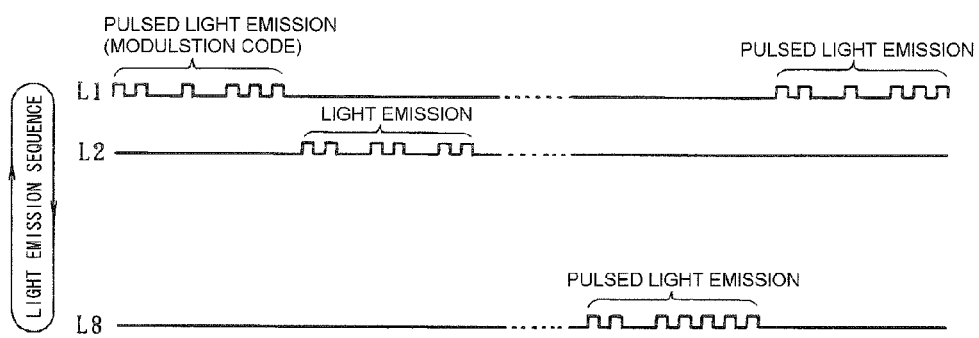
FIG. 2 is a waveform diagram showing a turn-on mode of LEDs mounted on the base plate shown in FIG. 1.

The multiple LEDs 3 can be mounted in a circular configuration on the base plate 1 and can be turned on in a mode shown in FIG. 2. Namely, the LEDs 3 can be sequentially turned on one at a time side by side, and this light emission pattern can be repeated periodically. Furthermore, a turned-on LED 3 can be configured to emit pulsed light according to a modulation code corresponding to each LED 3.

Figure 3:
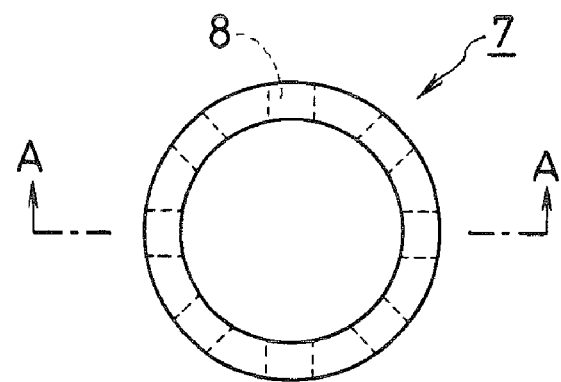
FIG. 3 is a plan view of an embodiment of a first mask for a multi-input optical switch made in accordance with principles of the disclosed subject matter.
Figure 4:
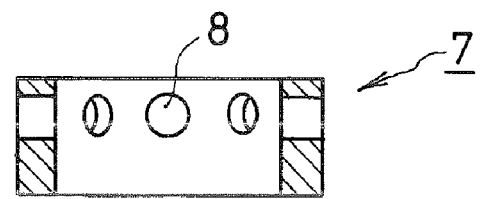
FIG. 4 is a cross sectional view of the first mask taken along line A-A in FIG. 3.

As shown in FIG. 3 and FIG. 4 (which is a cross sectional view taken along line A-A of FIG. 3), the first mask 7 has an approximately cylindrical shape with openings on both ends, and has through holes 8 configured in a predetermined size on a side wall at positions (eight positions in the figure)

corresponding to directions from the respective LEDs 3 installed outside the first mask 7 to the photo sensor 2 installed inside thereof when the first mask 7 is installed on the base plate 1. Thus, the photo sensor 2 and a center portion of a circular opening of the first mask 7 can approximately coincide with each other.

Figure 5:
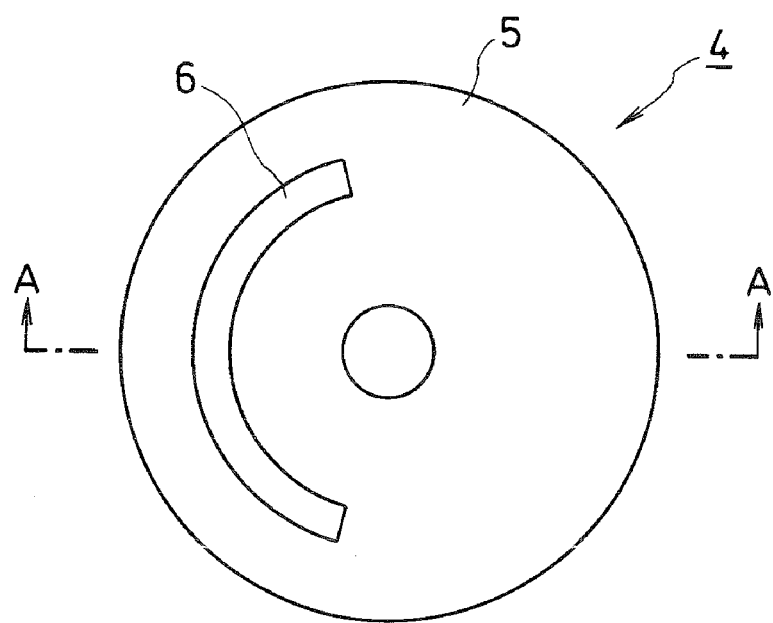
FIG. 5 is a plan view of an embodiment of a second mask for a multi-input optical switch made in accordance with principles of the disclosed subject matter.
Figure 6:
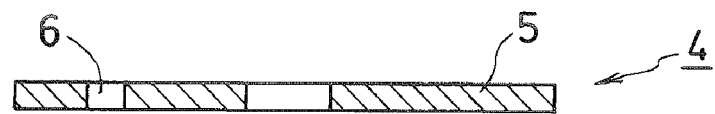
FIG. 6 is a cross sectional view of the second mask taken along line A-A in FIG. 5.

As shown in FIG. 5 and FIG. 6 (which is a cross sectional view taken along line A-A of FIG. 5), the second mask 4 is configured such that a translucent area 6 is provided as a part of an approximately circular light blocking plate 5. The translucent area 6 can be formed as an arc portion having a predetermined width at a position corresponding to multiple LEDs 3 which can be installed in a circular configuration on the base plate 1 when the second mask 4 is superposed on the base plate 1 while a center portion (where the photo sensor 2 is mounted) of the base plate 1 and a center portion of the light blocking plate 5 coincide with each other. The translucent area 6 may be formed by removing a part of the light blocking plate 5 made of a light blocking material to form a slit, or applying a light blocking treatment such as a black paint to a portion other than the translucent area 6 of a plate made of a translucent material, thereby leaving the translucent property to the translucent area 6. Alternatively, the translucent area 6 may be formed by a translucent material, and the other portion may be formed by a light blocking material.

Figure 7:
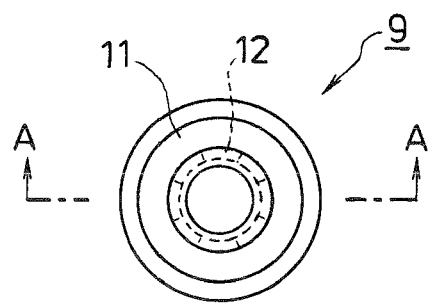
FIG. 7 is a plan view of an embodiment of a third mask for a multi-input optical switch made in accordance with principles of the disclosed subject matter.
Figure 8:
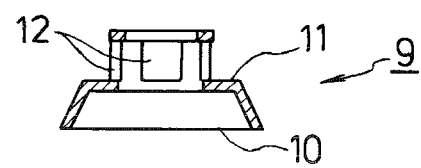
FIG. 8 is a cross sectional view of the third mask taken along line A-A in FIG. 7.

As shown in FIG. 7 and FIG. 8 (which is a cross sectional view taken along line A-A of FIG. 7), the third mask 9 has a step portion 11 at a middle portion, is open on both ends, is formed as a cup shape diverging toward the photo sensor 2, and the outer diameter of the opening 10 on the photo sensor side is smaller than the inner diameter of the first mask 7. The diameter of the opening opposite to that on the photo sensor 2 side is set so as to be joined to a protruded portion 15a of the light guiding body 13, which will be described in more detail later. The third mask 9 is placed on the base plate 1 while the opening 10 faces the base plate 1, and the position of the photo sensor 2 and a center portion of the opening 10 of the third mask 9 approximately coincide with each other. At least one through hole 12 having a predetermined size can be provided on a tubular wall above the step portion 11 (on the opposite side of the opening 10) of the third mask 9 and at a position which allows light, which has been emitted from the LEDs 3 and which has passed the through holes 8 of the first mask 9, to reach the inside of the tube of the third mask 9. This can occur while the multi-input optical switch is in an assembled state and is operated to move down the third mask 9.

Figure 9:
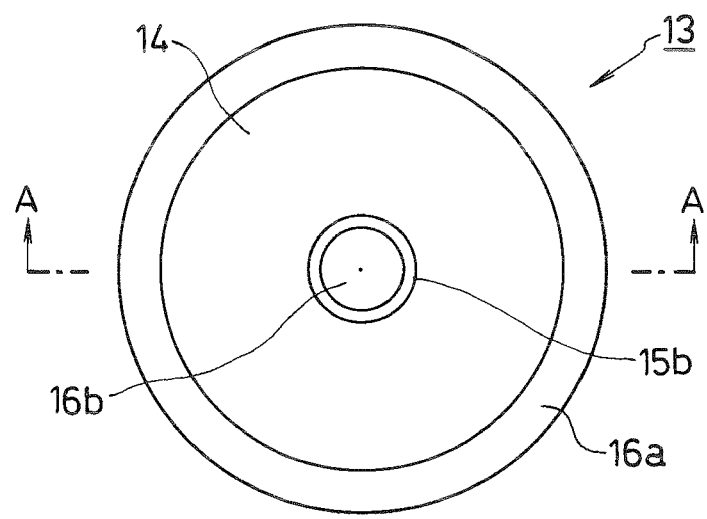
FIG. 9 is a plan view of an embodiment of a light guiding body for a multi-input optical switch made in accordance with principles of the disclosed subject matter.
Figure 10:
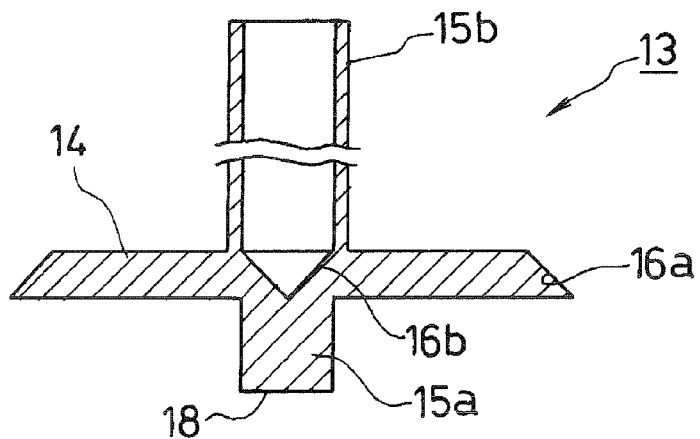
FIG. 10 is a cross sectional view of the light guiding body taken along line A-A in FIG. 9.
Figure 11:
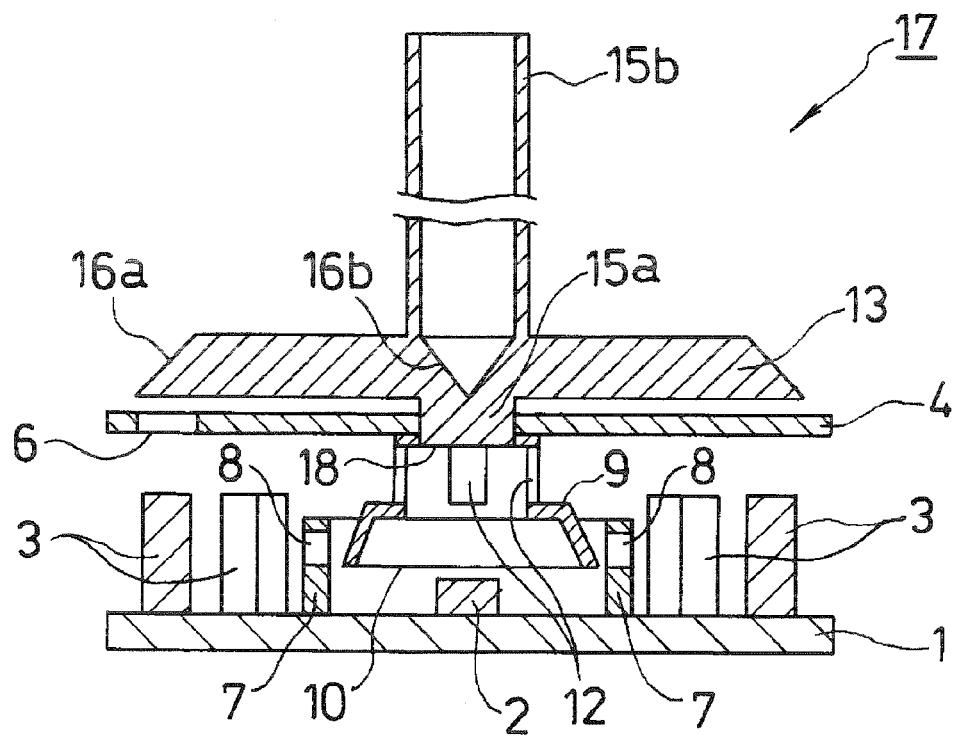
FIG. 11 is a cross sectional view of an embodiment of a multi-input optical switch made in accordance with principles of the disclosed subject matter.

As shown in FIG. 9 and FIG. 10 (which is a cross sectional view taken along line A-A of FIG. 9), the light guiding body 13 is made of a translucent material, and includes an approximately circular plate portion 14, a protruded portion 15a, and a rod portion 15b. The protruded portion 15a and the rod portion 15b can extend from a center portion of the plate portion 14 in both directions perpendicularly to the plate portion 14, and can be formed integrally with the plate portion 14. The plate portion 14 can include a total reflection surface 16a which reflects light emitted from the LEDs, and which light then enters the plate portion 14 through the translucent area 6 of the second mask, to deflect the traveling direction thereof toward the center portion of the plate portion 14. A total reflection surface 16b can also be provided on the plate portion 14 which reflects light from the total reflection surface 16a to deflect the light toward the protruded portion 15a. The total reflection surface 16a can be provided on an outer peripheral portion of the plate portion 14, which is reached by the light which has been emitted from the LEDs and which has passed the translucent area 6 of the second mask. The total reflection surface 16b can be located at a substantially center portion of the plate portion 14, which can be configured to direct the reflected light toward the protrusion of the protruded portion 15a. The total reflection surface 16b can be shaped as a cone.

The above description is given of components of a present embodiment of the disclosed subject matter. A description will now be given of an embodiment of a multi-input optical switch assembled from the above-described components with reference to FIG. 11.

As described with reference to FIG. 1, at least one photo sensor 2 can be mounted at a center portion of the approximately circular base plate 1. The multiple (eight) LEDs 3 can be arranged at positions separated by approximately the same angular interval on approximately the same circle about the photo sensor 2. Moreover, the first mask 7 is installed on the base plate 1 such that the photo sensor 2 and the center portion of the opening of the first mask 7 approximately coincide with each other, and the through holes 8 of the first mask 7 are positioned on lines respectively connecting the photo sensor 2 and the LEDs 3 with each other.

The second mask 4 can be integrally installed on the protruded portion 15a of the light guiding body 13 such that the protruded portion 15a is approximately at the center of the second mask 4. This integration may be carried out by inserting and fixing the protruded portion 15a to a hole portion provided in the center portion of the second mask 4, or forming the center portion of the second mask 4 with a transparent material, and then combining the second mask 4 and the protruded portion 15a such that the light emitted from the protruded portion 15a passes the transparent center portion. Furthermore, the third mask 9 can be integrally installed on an end portion of the protruded portion 15a of the light guiding body 13 so that light from the protruded portion 15a enters an opening opposite to the opening 10 while the opening 10 is facing the base plate 1. The rod portion 15b of the light guiding body 13 can be configured to serve as an operation lever used to operate the switch.

A fixed portion can include the base plate 1, the photo sensor 2, the LEDs 3, and the first mask 7. A movable portion can include the light guiding body 13, the second mask 4, and the third mask 9, which can all be combined by means of a member including a structure which tilts, rotates, and moves up/down while the photo sensor 2 and an end portion 18 of the protruded portion 15a of the light guiding body 13 face each other.

A description will now be given of an exemplary relationship between operation methods and detection mechanisms of a multi-input optical switch made in accordance with principles of the disclosed subject matter. The multi-input optical switch can be configured to select one of three detection modes by means of three operation methods: tilting, rotating, and pushing down the operation lever.

Figure 12:
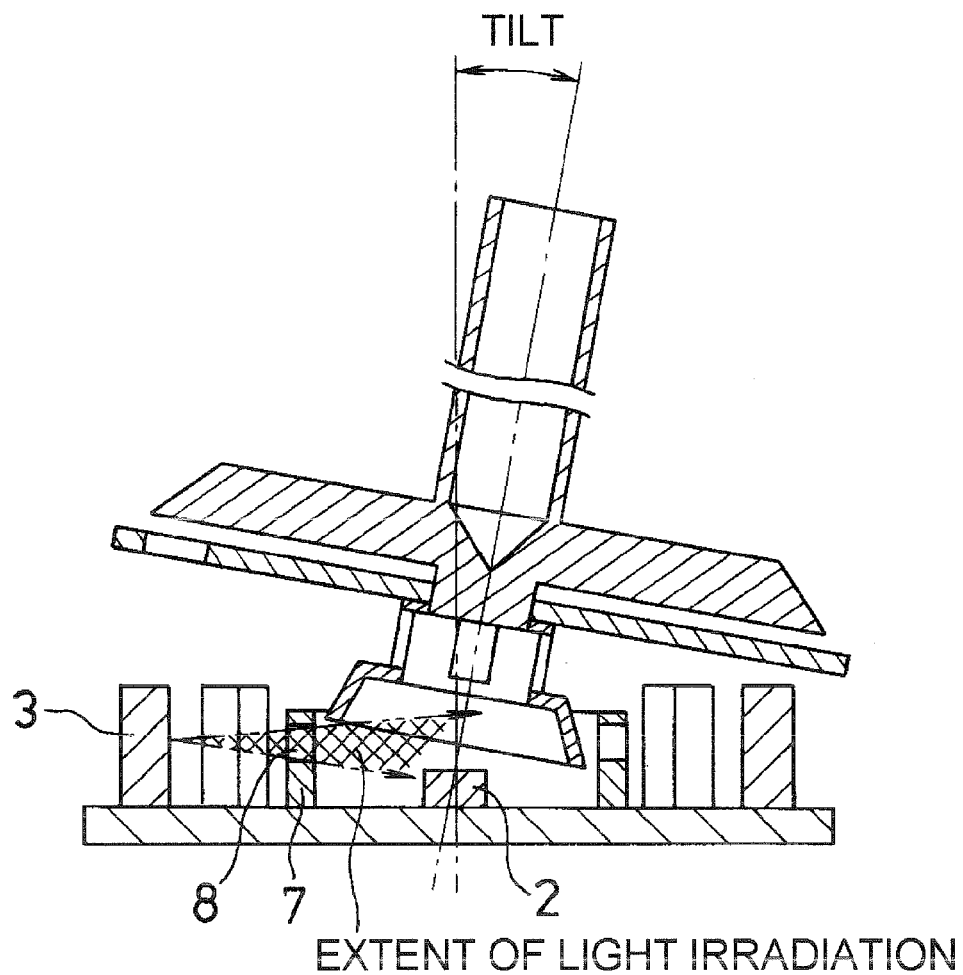
FIG. 12 is a cross sectional view showing an operation state of the embodiment of the multi-input optical switch of FIG. 11.

First, a description will be given of a detection mechanism configured for use during the tilting of the operation lever with reference to FIG. 12. If the operation lever (rod portion 15b) is tilted in a direction opposite to the LED 3 about the photo sensor 2 in FIG. 12, the light emitted from the LED 3 along the optical axis approximately parallel with the base plate 1 progresses toward the photo sensor 2 through one of the through holes 8 on the first mask 7, and is detected by the photo sensor 2.

The operation of tilting the operation lever can be detected in as many ways as the number of LEDs 3 since the number of the thorough holes 8 formed on the first mask 7 is the same as the number of the LEDs 3 mounted on the base plate 1. According to the present embodiment, since eight LEDs 3 are mounted, the detection of tilt is possible in eight directions.

In this case, in order to identify the direction in which the operation lever is tilted, it is necessary to identify which LED emits the light detected by the photo sensor 2. As described with reference to FIG. 2, the eight LEDs 3 sequentially turn on one at a time in the time-division manner, this light emission pattern is repeated periodically, and the LED, which is on, emits light according to a modulation code corresponding to each LED. Thus, by determining the modulation code of the LED light that is detected by the photo sensor 2, the LED that serves as the light source can be identified, and the tilted direction of the operation lever can thus be identified.

Figure 13:
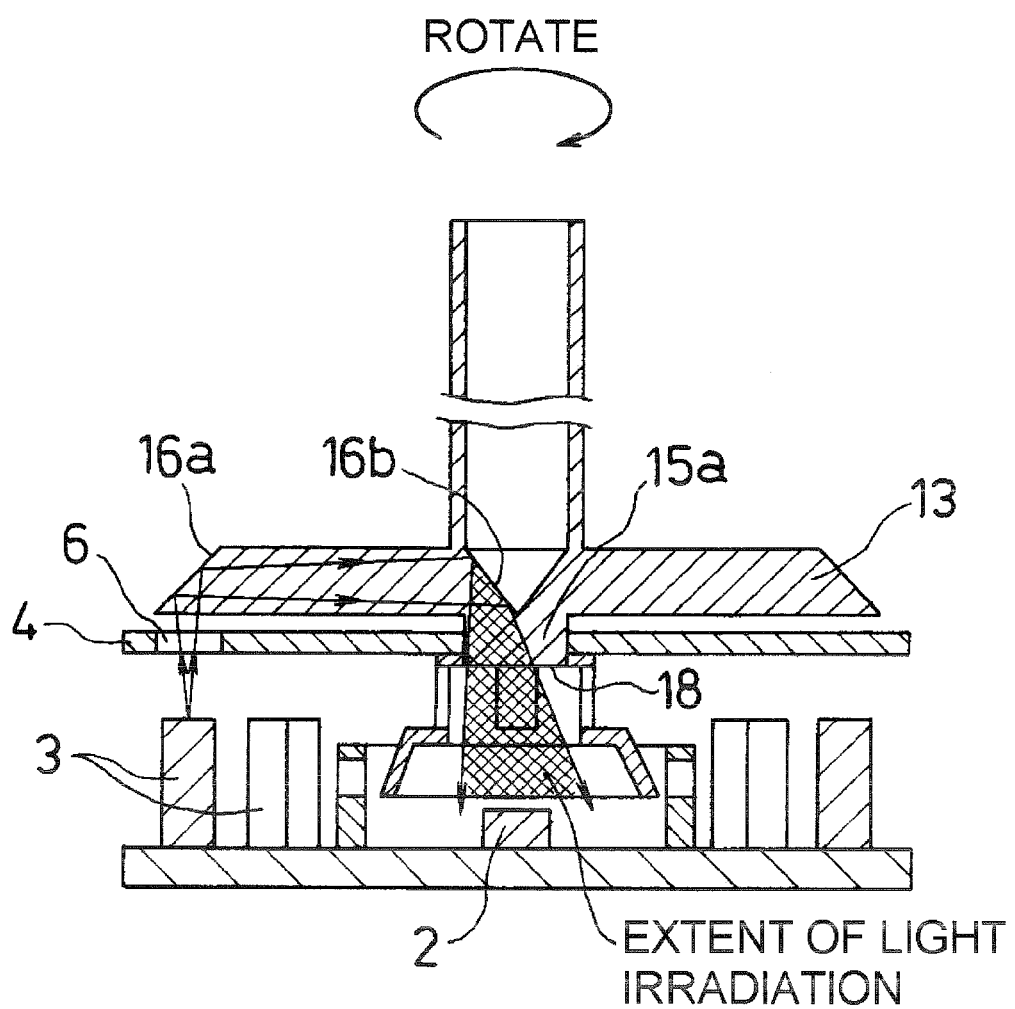
FIG. 13 is a cross sectional view showing another operation state of the embodiment of the multi-input optical switch according to FIG. 11.
Figure 14:
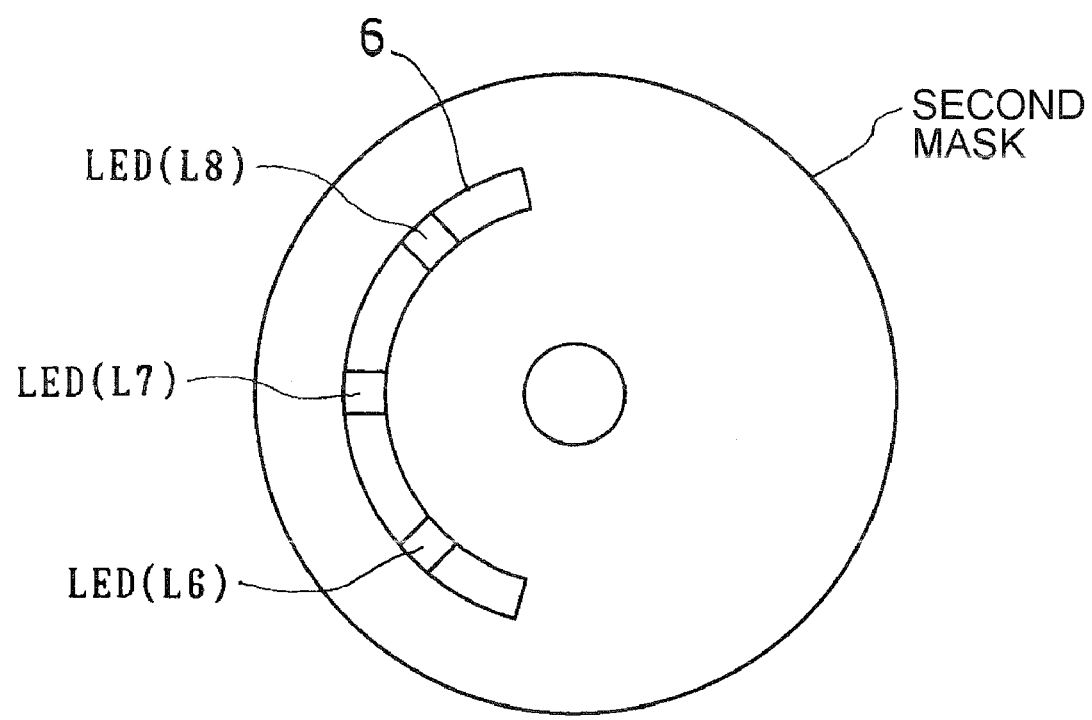
FIG. 14 depicts a function of the second mask of FIG. 5.
Figure 15:
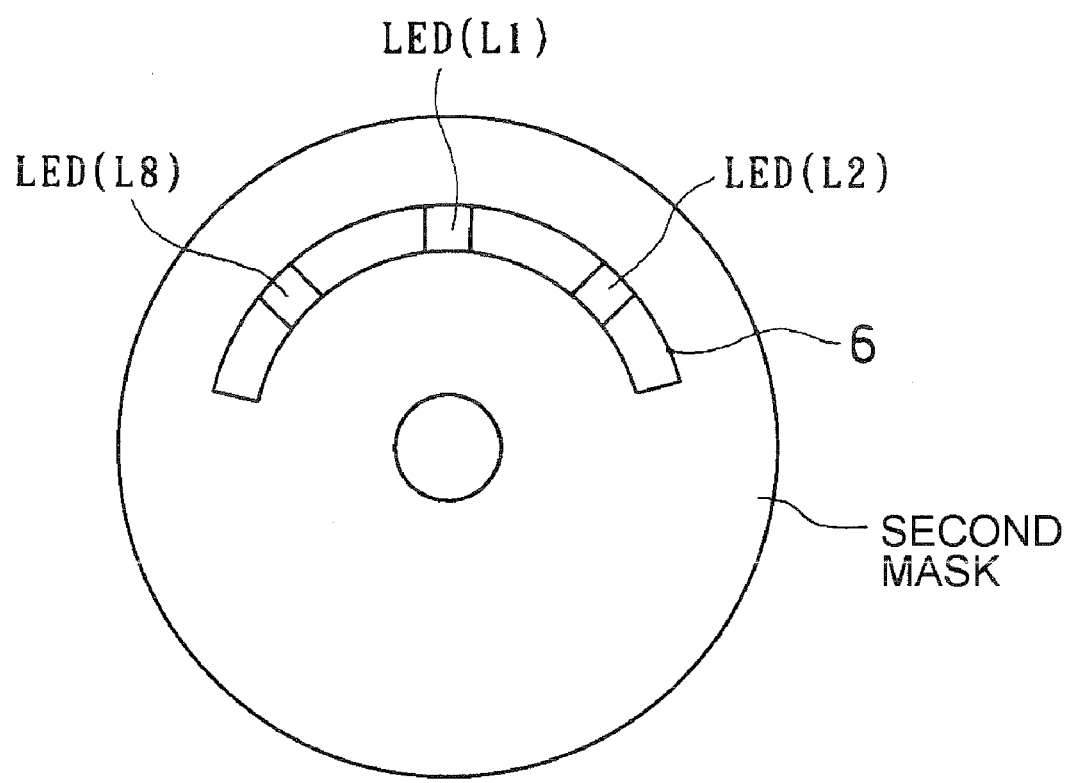
FIG. 15 also depicts a function of the second mask of FIG. 5.

A description will now be given with reference to FIGS. 13 to 15 of a detection mechanism that is configured to detect rotation of the operation lever. As shown in FIG. 13, light emitted from the LEDs 3 passes through the arc shape translucent area 6 formed on the second mask 4, and then enters the light guiding body 13 installed there above. The light, which has entered in the light guiding body 13, is guided through the light guiding body 13, reflected by both the total reflection surfaces 16*a* and 16*b*, emerges from the end portion 18 of the protruded portion 15*a* toward the photo sensor 2, and is detected by the photo sensor 2.

The translucent area 6 formed on the second mask 4 can be configured to be long so as to allow light emitted from multiple LEDs to pass at the same time. If the operation lever is rotated to a different rotational angle, the light that is initially emitted from three LEDs (L6, L7, and L8, for example) and detected by the photo sensor 2 as shown in FIG. 14 is changed in terms of composition. Specifically, after the lever is rotated to a different rotation angle, the light emitted from a different composition of LEDs (L1, L2, and L8, for example) may be detected by the photo sensor 2, as shown in FIG. 15.

Thus, by identifying a combination of LED light detected by the photo sensor, it is possible to identify the rotational angle of the operation lever. In this case, it is also possible to identify the combination of the multiple LEDs which are light sources by determining the modulation codes of the LEDs which sequentially turn on one at a time in the time-division manner.

According to the above described embodiment, there are two possible patterns of combined LEDs whose light passes the translucent area at the same time. In particular, the patterns include patterns of three and four LEDs. Rotational angles of the operation lever detected by means of a combination of three LEDs and rotational angles of the operation lever detected by means of a combination of four LEDs are mutually intermediate rotational angles.

Though the translucent area 6 according to the above described embodiment can be of a length that allows light emitted from as many as four LEDs to pass there through at the same time, this length is not mandatory. For example, the rotational angle can be detected when the LED light emitted from at least one to six LEDs passes through the translucent area 6 at the same time. This can be achieved in consideration of the detection of the pushing operation, which is described in more detail later.

Figure 16:
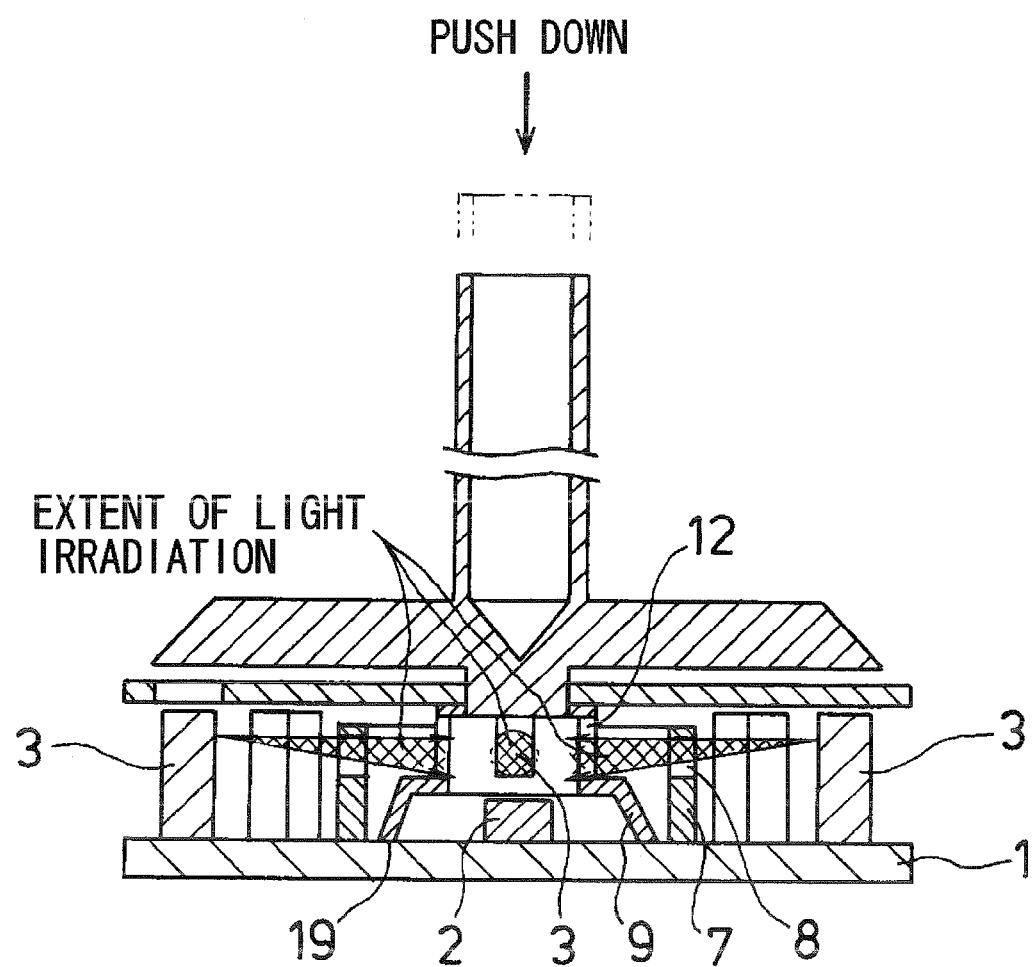
FIG. 16 is a cross sectional view showing an operation state of the embodiment of the multi-input optical switch of FIG. 11.
Figure 17:
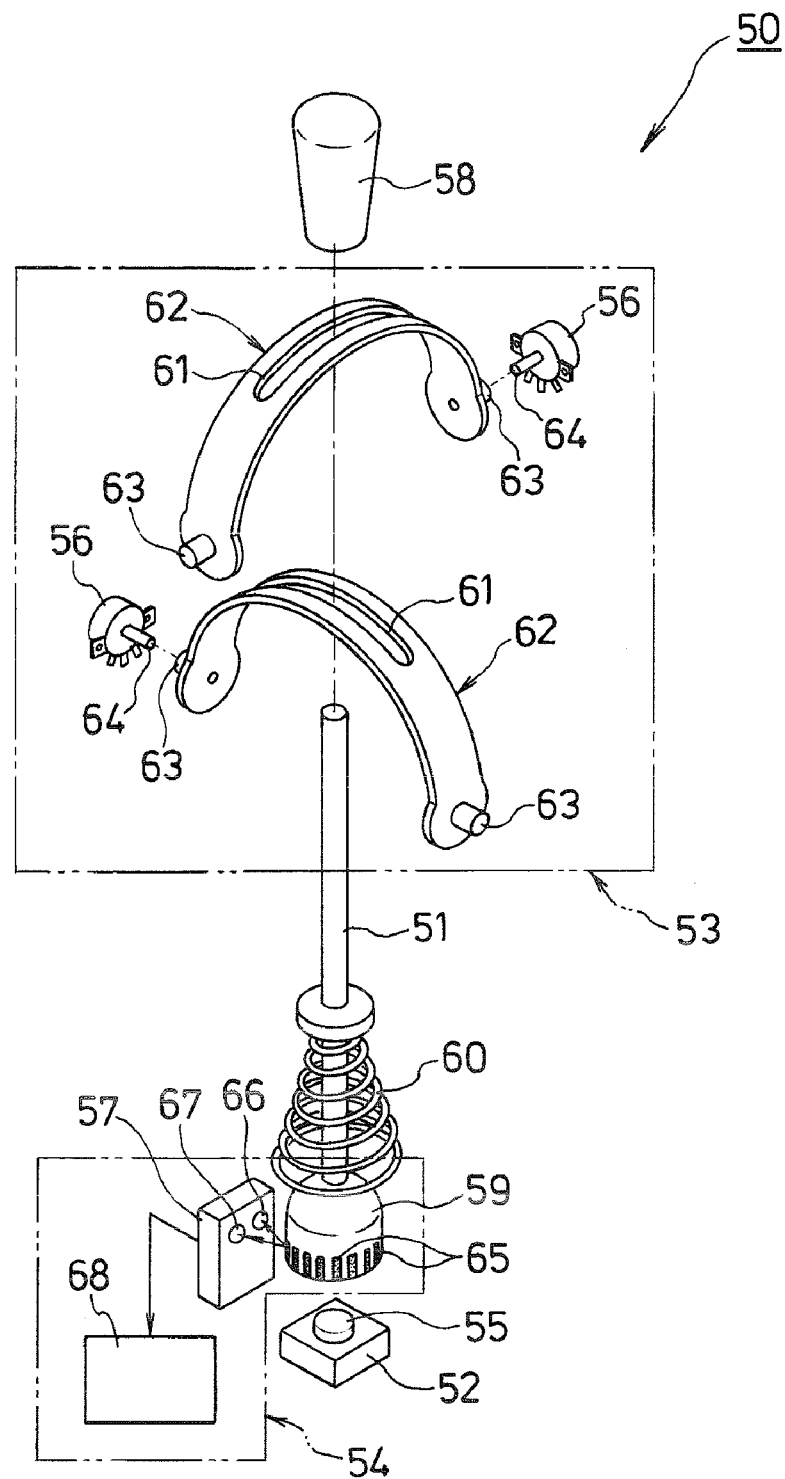
FIG. 17 is an exploded perspective view of a conventional multi-input optical switch.

A description will now be given with reference to FIG. 16 of a detection mechanism that is configured to detect a pushing down operation upon the lever. The operation lever can be pushed down, and can be maintained in a state where the open end 19 of the third mask 9 is in contact with the base plate 1. In this state, light that is respectively emitted along the optical axes orthogonal to each other, and approximately parallel with the base plate 1 from four LEDs 3 passes the through holes 8 on the first mask 7, then passes the through holes 12 on the third mask 9, enters the third mask 9, and is detected by the photo sensor 2.

Thus, if LED light detected by the photo sensor 2 includes light emitted from four LEDs 3, it is determined that the operation lever is being pushed down.

As described above, since the multi-input optical switch only uses the LED light as a detection medium, there is no mechanical contacts in the portions relating to the switch detection, resulting in excellent durability and detection reliability.

Moreover, the respective LEDs are sequentially turned on in the time-division manner according to the individual modulation codes. Thus, by identifying a combination of LED light detected by the photo sensor according to the modulation codes, it is possible to detect the operation state of the switch. On this occasion, the identification of the modulation codes is carried out by software running on a CPU installed on a main device. It is thus not necessary to provide an external component or circuit, and the overall device can be manufactured at a low cost.

Moreover, it is possible to identify the position of a LED which has emitted light detected by the photo sensor by identifying the modulation code of the LED light. Thus, it is possible to detect a rotational angle brought about by the rotating operation as an absolute rotational angle. Furthermore, since the detection medium is light, the detection speed is high, and highly certain detection can be secured regardless of the speed of the rotating operation.

Further, because there is no relationship between the detection mechanisms of the switch and the sense (feel) of the operation, freedom of design for operability can be secured. In addition, precision requirements for assembly can be loosened, resulting in a reduction of manufacturing cost.

It should be noted that the LED light, which serves as the detection medium, can also be used as illumination light for the switch at the same time.

While there has been described what are at present considered to be exemplary embodiments of the disclosed subject matter, it will be understood that various modifications may be made thereto, and it is intended that the appended claims cover such modifications as fall within the true spirit and scope of the disclosed subject matter. The above-referenced conventional art references and their English abstracts are hereby incorporated in their entirety by reference.

What is claimed is:

1. A multi-input optical switch comprising:
   a base plate including a top portion and a bottom portion;
   at least one photo sensor located adjacent the base plate;
   a plurality of LEDs which are arranged at positions separated by approximately the same angular interval and at a diametrical distance from each other about a substantial circle about the photo sensor, the plurality of LEDs configured to emit light in a direction that is substantially parallel with a surface of the base plate and toward the photo sensor, and in an upward direction with respect to the surface of the base plate;
   a first mask having a substantially cylindrical shape with an inner diameter and an outer diameter that is smaller than the diametrical distance of the substantial circle upon which the LEDs are arranged, the first mask including a plurality of through holes which are disposed on respective imaginary lines connecting respective LEDs and the photo sensor;

a second mask formed as a substantially flat light blocking plate, and including a translucent area configured to allow light traveling upward from the LEDs to pass therethrough;

a light guiding body made of a translucent material and having a substantially flat plate portion, a protruded portion which extends downward from a center portion of the plate portion, a rod portion which extends upward from the center portion of the plate portion, a first total reflection surface provided on an outer peripheral portion of the light guiding body and being configured to reflect light received from the LEDs toward a center portion of the light guiding body, and a second total reflection surface which is configured to reflect light received from the first total reflection surface toward the protruded portion; and a third mask configured in a tubular cup shape with an outer diameter that is smaller than the inner diameter of the first mask, diverges downward, and has an opening at a bottom end, a step portion located at an intermediate position thereof, and at least one through hole on an upper cylindrical wall above the step portion, the at least one through hole being located at a position such that, upon the third mask being pushed down, light from at least one of the LEDs passes through the at least one through hole of the third mask to an inside of the third mask, wherein the second mask is located adjacent the protruded portion of the light guiding body, a top end portion of the third mask is located adjacent an end surface of the protruded portion, and the rod portion is configured to freely tilt, rotate, and move up and down while the photo sensor and the end surface of the protruded portion of the light guiding body face each other.

2. The multi-input optical switch according to claim 1, wherein respective LEDs emit pulsed light in a sequential time-division manner according to a unique modulation code.

3. The multi-input optical switch according to claim 1, wherein the photo sensor is selected from a group consisting of a photodiode, a PIN photodiode, and a phototransistor.

4. The multi-input optical switch according to claim 1, wherein the first mask is configured such that, upon tilting of the light guiding body, the light emitted from at least one of the LEDs mounted on a side opposite to a tilted-down side passes through at least one of the plurality of through holes provided on the first mask, and is detected by the photo sensor.

5. The multi-input optical switch according to claim 1, wherein the second mask is configured such that, upon the light guiding body being rotated, the light emitted from at least one of the LEDs passes through the translucent area provided on the second mask, enters into the light guiding body, is guided through the light guiding body, and emerges from the end surface of the protruded portion, and is detected by the photo sensor.

6. The multi-input optical switch according to claim 1, wherein the first mask and the third mask are configured such that, upon the light guiding body being moved down, light emitted from at least one of the plurality of LEDs sequentially passes through at least one of the through holes provided on the first mask and through at least one of the through holes provided on the third mask, and is detected by the photo sensor.

7. The multi-input optical switch according to claim 2, wherein the photo sensor is selected from a group consisting of a photodiode, a PIN photodiode, and a phototransistor.

8. The multi-input optical switch according to claim 2, wherein the first mask is configured such that, upon tilting of the light guiding body, the light emitted from at least one of the LEDs mounted on a side opposite to a tilted-down side passes through at least one of the plurality of through holes provided on the first mask, and is detected by the photo sensor.

9. The multi-input optical switch according to claim 3, wherein the first mask is configured such that, upon tilting of the light guiding body, the light emitted from at least one of the LEDs mounted on a side opposite to a tilted-down side passes through at least one of the plurality of through holes provided on the first mask, and is detected by the photo sensor.

10. The multi-input optical switch according to claim 2, wherein the second mask is configured such that, upon the light guiding body being rotated, the light emitted from at least one of the LEDs passes through the translucent area provided on the second mask, enters into the light guiding body, is guided through the light guiding body, and emerges from the end surface of the protruded portion, and is detected by the photo sensor.

11. The multi-input optical switch according to claim 3, wherein the second mask is configured such that, upon the light guiding body being rotated, the light emitted from at least one of the LEDs passes through the translucent area provided on the second mask, enters into the light guiding body, is guided through the light guiding body, and emerges from the end surface of the protruded portion, and is detected by the photo sensor.

12. The multi-input optical switch according to claim 2, wherein the first mask and the third mask are configured such that, upon the light guiding body being moved down, light emitted from at least one of the plurality of LEDs sequentially passes through at least one of the through holes provided on the first mask and through at least one of the through holes provided on the third mask, and is detected by the photo sensor.

13. The multi-input optical switch according to claim 3, wherein the first mask and the third mask are configured such that, upon the light guiding body being moved down, light emitted from at least one of the plurality of LEDs sequentially passes through at least one of the through holes provided on the first mask and through at least one of the through holes provided on the third mask, and is detected by the photo sensor.

14. A multi-input optical switch comprising:
a base plate including a top portion and a bottom postion;
at least one photo sensor located adjacent the base plate;
a plurality of LEDs which are arranged at positions separated by approximately the same angular interval and at a diametrical distance from each other about a substantial circle about the photo sensor, the plurality of LEDs configured to emit light in a direction that is substantially parallel with a surface of the base plate and toward the photo sensor, and in an upward direction with respect to the surface of the base plate;
a first mask located adjacent the plurality of LEDs, the first mask having a substantially cylindrical shape and including a plurality of through holes;
a second mask located adjacent the plurality of LEDs, the second mask including a translucent area configured to allow light traveling upward from at least one of the LEDs to pass therethrough;

a translucent light guiding body including a plate portion that has a center portion, a protruded portion which extends downward from the center portion of the plate portion, a rod portion which extends upward from the center portion of the plate portion, a first total reflection surface which is located at an outer peripheral portion of the light guiding body and is configured to reflect light received from at least one of the LEDs toward a center portion of the light guiding body, and a second total reflection surface which is configured to reflect light received from the first total reflection surface toward the protruded portion; and a third mask configured in a tubular shape and including at least one through hole that passes through the tubular shape, the at least one through hole located at a position such that, upon the third mask being pushed down, light from at least one of the LEDs passes through the at least one through hole to an interior area of the third mask, wherein the second mask and third mask are attached to the light guiding body, and the second mask, third mask, and light guiding body are configured to tilt, rotate, and move up and down with respect to the base plate.

15. The multi-input optical switch according to claim 14, wherein respective LEDs emit pulsed light in a sequential time-division manner according to a unique modulation code.

16. The multi-input optical switch according to claim 14, wherein the photo sensor is selected from a group consisting of a photodiode, a PIN photodiode, and a phototransistor.

17. The multi-input optical switch according to claim 14, wherein the first mask is configured such that, upon tilting of the light guiding body, the light emitted from at least one of the LEDs mounted on a side opposite to a tilted-down side passes through at least one of the plurality of through holes provided on the first mask, and is detected by the photo sensor.

18. The multi-input optical switch according to claim 14, wherein the second mask is configured such that, upon the light guiding body being rotated, the light emitted from at least one of the LEDs passes through the translucent area of the second mask, enters into the light guiding body, is guided through the light guiding body, and emerges from the end surface of the protruded portion, and is detected by the photo sensor.

19. The multi-input optical switch according to claim 14, wherein the first mask and the third mask are configured such that, upon the light guiding body being moved down, light emitted from at least one of the plurality of LEDs sequentially passes through at least one of the through holes provided on the first mask and through at least one of the through holes provided on the third mask, and is detected by the photo sensor.

* * * * *